3,239,371
PAPER PRODUCTS SURFACE SIZED WITH POLY-
ETHYLENE AND METHOD OF MAKING THE
SAME
Robert C. Whitney, Overland Park, and Thadeus J. Brud-
niak, Prairie Village, Kans., assignors, by mesne as-
signments, to Gulf Oil Corporation, Pittsburgh, Pa., a
corporation of Pennsylvania
No Drawing. Filed May 28, 1962, Ser. No. 197,910
5 Claims. (Cl. 117—155)

This invention relates to improved paper products, and to methods of making the same. In particular, this invention relates to paper products surface-sized with polyethylene, and to methods of making same.

Surface sizing, that is, the treatment of dried paper to increase its water resistance, strength, hardness, resistance to penetration by oil-base and water-base inks, resistance to pick, or to improve other characteristics or properties, is well known in the art. Heretofore, the principal surface sizing materials used have been glue, starch, wax, rosin, water-soluble synthetic resins such as polyvinyl alcohol, melamine resins, urea-formaldehyde resins, sodium carboxymethyl cellulose, and the like.

It has now been found that particularly desirable surface-sized paper products can be prepared using polyethylene as the sizing agent, and by applying the polyethylene to a paper surface from stable polyethylene aqueous emulsions or latices of the type described in copending applications, Serial No. 44,862, Serial No. 104,711, and Serial No. 104,763.

In lieu of emulsions of polyethylene homopolymers, it is also feasible to employ emulsions of polyethylene copolymers in which at least 50% by weight of ethylene is copolymerized with up to 50% by weight of copolymerizable vinylidene monomer of the formula $CH_2=C<$. Typical examples of such comonomers include vinyl halides, acrylic and methacrylic acids, esters of 1–18 carbon alcohols with acrylic and methacrylic acids, acrylonitrile, vinyl acetate, styrene, etc. Typical examples of such polyethylene copolymer latices are shown in pending applications Serial No. 44,839 and Serial No. 197,234.

In surface sizing papers with latices of this type, polyethylene alone may be employed as the sizing agent, or it may be combined with other, conventional, sizing agents. For example, particularly good results have been obtained by the use of polyethylene in combination with starch as a sizing material.

The use of polyethylene latices of the type described in the aforementioned copending applications to deposit polyethylene solids as a surface size on a paper surface, suitably in combination with starch, leads to the formation of sized papers comparable with papers sized with conventional agents such as starch in strength (burst, tear, tensile, and fold), optical properties (gloss, opacity, and brightness), and resistance to pick. Moreover, the inclusion of polyethylene in a sized paper results in greater smoothness and improved resistance to penetration by oil-base and water-base inks. The paper products are free of objectionable odor and color.

Further, and most surprisingly, polyethylene present in even small quantities in a surface size functions as an anti-static agent which inhibits the formation or retention of electrostatic surface charge on paper sized therewith. In particular, paper sheets comparable with the treated papers of the invention, except for the presence of polyethylene in the surface size, tend to acquire persistent electrostatic charges, most commonly by mechanical friction in manufacturing or handling. This results in an annoying tendency of the sheets to cling to each other, which makes their separation difficult and interfers with effective paper handling in mechanical devices such as high speed printing presses or office duplicating devices such as xerographic duplicators. In contrast, polyethylene-sized papers according to the present invention show little or no tendency to cling or adhere due to electrostatic forces when subjected to the same conditions as the untreated papers.

The process of the present invention can be used to size paper products, such as paper and paperboard, of any variety, including those prepared from a furnish ranging between 100% hardwood to 100% softwood. These paper products may be prepared from kraft, sulfite, or soda pulps, together with groundwood, chemi-groundwood, and/or semi-chemical pulps, bleached or unbleached. The products may comprise other cellulosic fibers such as rag stock, cotton, flax, hemp, and bagasse, in whole or in part, or synthetic fibers. The invention is of particular utility when used to improve cheaper grades of uncoated book, news and wrapping, and writing and printing papers such as writing tablets and papers for offset, rotogravure, or letterpress printing. These papers are all relatively porous and have a porosity (as measured on a Gurley densometer—TAPPI standard T–460m-49) of less than 1000, usually less than about 200 or 250. Papers of this type, after treatment according to the invention, can subsequently be pigment-coated with materials such as calcium carbonate, titanium dioxide, clay, etc., in a manner known in the art, to improve paper and paperboard products of any weight, and can be employed to improve the surface properties of waterleaf papers and of hard-sized and slack-sized papers prepared using all types of stock sizes.

As is conventional in the papermaking art, the surface sizes of the present invention are suitably applied to the product surface on or off-machine from a size tub, size press, or from water boxes in the calender stack. It is most convenient to apply the size with a size press. Although the polyethylene can be applied alone from a stable polyethylene latex, or in combination with other conventional surface sizes such as glue, polyvinyl alcohol, alginates, or the like, particularly good results which are also attractive from an economic or commercial viewpoint have been obtained by applying polyethylene in combination with starch as a surface size.

As discused in "Pulp and Paper," vol. 2, by Casey, Interscience Publishers, Inc., New York (1960), starches obtained from corn or wheat, potato starch, tapioca starch, and starches derived from still other natural materials are commonly employed as sizing agents in the papermaking arts. The starches may be used as pearl starch, or as modified starches, and all these materials are referred to herein as "starch." Modifications including chlorination, acetylation, oxidation, enzyme conversion, roasting, acid treatment, etc. are known in the art. The starch sizing agents of the prior art can be adapted to the present invention without departure from conventional techniques for their preparation.

The starch suspensions used in surface sizing suitably contain from about 2% to about 14% by weight of starch solids, or, often, from about 2% to about 8%. The concentration of starch solids in the sizing fluids depends in part on the viscosity of the starch dispersions. For example, using certain starches such as potato starch, a high starch concentration can be used while retaining fluidity sufficient to permit easy application with conventional apparatus. With other starches, the concentration of the starch suspension may be lower, within the limits set forth above, to retain fluidity. Also, the concentration of starch used depends on the basis weight of the paper being treated, and the quality of final product desired. As basis weight increases, the amount of penetration of the sizing agent into the paper sheet increases and more concentrated starch solutions are generally desired. Also, as greater quantities of starch and polyethylene sizing agent are applied to a paper surface the quality of the paper is improved; ultimate limits may be dictated by a balance of product quality and product cost.

When used in combination with conventional starch dispersions, ethylene latices of the types mentioned herein are generally combined with the starch dispersions such that the latex solids are from about 2% to about 10% by weight of the starch solids employed. At concentrations of polyethylene much lower than about 2%, the beneficial effects of polyethylene inclusion become less noticeable, though concentrations as low as 1% can be used. At polyethylene concentrations of greater than about 10%, the beneficial effects of polyethylene are retained, but the cost of materials tends to make the process uneconomical, though concentrations as high as 15–20% can be used. In general, properties such as increased smoothness, greater resistance to oil and ink penetration, and the like, improve as the quantity of polyethylene increases. However, the important anti-static effects of polyethylene inclusion in a surface size are observed even at very low concentrations of polyethylene.

In preparing the polyethylene-containing starch sizing agent of the invention, it is convenient to proceed by preparing a concentrated solution or dispersion of starch in the conventional manner by heating in water or cooking, then combining sufficient polyethylene latex of known concentration to bring the polyethylene and starch solids to the desired levels, and then diluting the resulting starch latex mixture to volume, for example. However, the mode of combining the starch dispersion and polyethylene latex is not critical.

In the surface sizing treatment of the invention, wet pickup at the size press may amount from about 20% to about 60% by weight of the dry paper, usually about 25 to 35% wet pickup, though these figures are not critical. The starch content of the final dry paper product may vary from about 8 lbs. per ton to about 166 lbs. per ton, whereas that of the polyethylene included therewith may vary from about 0.15 lb. per ton to about 15.8 lbs. per ton, suitably from about 0.4 to 8 lbs. per ton.

As disclosed in copending application Serial No. 104,763, stable polyethylene latices of a type suitable for use in the present invention can be directly prepared by emulsion polymerization of ethylene at polymerization temperatures and pressures in a charge mixture comprising water, an anionic emulsifying agent, a pH adjuster in some cases, an optional solvent, and a polymerization initiator. In view of the detailed teachings of this copending application, it is impractical to recite all of its contents herein, and it is to be understood that the application is specifically incorporated into the present application by reference. In its essentials, however, the copending application teaches that ethylene can be polymerized at a minimum pressure of about 2,500 pounds per square inch in an aqueous phase comprising between about 0.9 and 9 percent by weight of (1) the salts of saturated fatty acids, (2) salts of sulfates of fatty alcohols, or (3) salts of sulfates of ethoxylated fatty alcohols, as emulsifying agents. Alkaline substances, such as potassium phosphates, giving a pH of at least about 8.5 in the final product are suitably present in the aqueous phase. Tertiary butanol is optionally employed in the aqueous medium, but, if present, is present in amounts of from about 5 to about 20–25 percent by weight of the aqueous medium. Potassium and sodium persulfates are employed in amounts of from about 0.06 percent to about 0.5 percent by weight of the aqueous phase as free radical initiators. At temperatures of from about 70° to about 100° C., stable polyethylene latices containing up to about 30 percent by weight of solids are obtained, and can be concentrated to latices containing as high as about 40 to 50 percent by weight of solids. As disclosed in said copending application, the latices are reactor stable, that is, they can be produced by emulsion polymerization as homogeneous products substantially free of coagulum and containing at least 20% of polyethylene solids. Further, the latices are strip-stable, that is, they are susceptible to concentration by removal of excess water and any solvent which may be present to produce concentrated latices containing solids of at least 40% by weight. Third, the latices are shelf-stable, having a high resistance to creaming, gelling, or thickening, for periods of 60 days, six months, or a year or more.

In these latices, the polyethylene solids contained therein are colorless, odorless, and non-oxidized. They contain less than about 1% oxygen and are substantially sulfur-free (less than about 0.1%) non-telomerized materials having a molecular weight from between about 7,000 to about 30,000 or 40,000. The materials are of intermediate density, between about 0.91–0.93 gram/cm.$^3$. The solids have an inherent viscosity between about 0.25 and about 1.1. (0.1 gram of polymer in 50 ml. of tetralin at 135° C.), and have a crystalline melting point of about 80°–115° C. The solids are present in the latices as particles of an average size between about 0.02 to about 0.5 micron.

The polyethylene latices prepared by the aqueous emulsion polymerization of ethylene in the presence of certain nonionic emulsifying agents as disclosed in copending patent application Serial No. 44,862, are also incorporated herein by reference. As disclosed in this application, these nonionic polyethylene latices are obtained by polymerizing ethylene in an aqueous medium at a temperature of about 60° to 150° C., preferably at a temperature of from 70° C. to 100° C., and at pressures between 2,000–20,000 p.s.i. The aqueous medium may contain an alcohol such as t-butanol in amounts of up to 35% by weight of the medium. Using an alkali metal persulfate initiator, such as potassium persulfate, generally in amounts of from 0.08% to 0.50%, polymerization proceeds in the presence of about 1 to 5% of a nonionic emulsifier, the percentages being based on the weight of aqueous medium. These nonionic emulsifiers are alkyl phenoxy polyoxyethylene glycols of the formula:

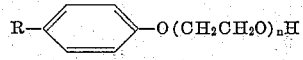

where R is an alkyl chain having 8 or 9 carbon atoms, advisably branched such as polypropylene or polybutylene chains, and $n$ represents an average of 7 to about 15. Colorless, odorless latices of non-oxidized polyethylene are obtained.

As taught in copending application Serial No. 104,711, the anionic and nonionic latices described above can be rendered highly stable by the addition to these latices of such amounts of nonionic or anionic emulsifying agents as will, together with the primary emulsifying agents employed in the preparation of the latices, substantially saturate the surface of the polyethylene particles in the latex. That is, substantially 100% of the available surface of these particles will be covered with a monomolecular layer of primary and secondary emulsifier. The numerous details of this copending application are similarly specifically incorporated herein by reference.

A better understanding of the invention and of its many advantages will be had by referring to the following specific examples, given by way of illustration.

EXAMPLE I

A paper was prepared from a furnish containing 720 parts by weight of hardwood kraft pulp and 480 parts by weight of softwood kraft pulp beaten to a Canadian Standard Freeness of 350. Two hundred forty parts by weight of Georgia clay, 6 parts by weight of rosin size, minor quantities of blue and pink dyes, and sufficient papermaker's alum to bring the pH to 4.5–5.5 were added. A 60 lb. basis weight (24 x 36–500) paper was formed from this mixture in the conventional manner. At the size press, an 8% solution of acetylated starch ("Kofilm–80") prepared from 72 parts by weight of starch admixed with 828 parts by weight of water was applied to the paper surface. The resulting starch surface-sized paper served as a control for comparison with the same paper sized with starch and polyethylene according to the present invention.

A series of such polyethylene-sized papers was prepared by incorporating such quantities of an anionic polyethylene latex into the starch solution described above as gave concentrations of 2, 4, 8, and 10% of latex solids by weight of starch solids. In another series, sufficient quantities of a nonionic polyethylene latex were combined with a starch solution to give a content of 2.4, 4, 8, and 10% by weight of latex solids based on starch solids.

The anionic polyethylene latex was prepared by continuous aqueous emulsion polymerization of ethylene at pressures between 3300 and 3500 pounds per square inch at a temperature of 85° C. with a residence time of 1.33 hours in the apparatus. The aqueous polymerization medium employed comprised 100 parts by weight of water, 2.9 parts by weight of myristic acid, about 0.88 parts by weight of potassium hydroxide, about 0.42 parts by weight of tripotassium phosphate, and about 0.09 parts by weight of potassium persulfate. The resulting latex had a total solids content of 41.92% after concentration, a latex density of 0.977 g./ml., and a pH of 10.8. The polymer particles had an average size of about 0.062 micron. The ring and ball softening point of the polyethylene polymer in the latex was 110° C., the inherent viscosity of the polymer was 0.66 (0.1 gram of polymer in 50 ml. of tetralin at 135° C.), the polymer density was 0.92, crystalline melting point 100–107° C. The polymer was free of color and odor.

The nonionic polyethylene latex was prepared at a pressure of 3000 p.s.i. and a temperature of 87° C., in an aqueous medium comprising 88 parts by weight of water, 12 parts by weight of t-butanol, 2.2 parts by weight of "Triton N–101" emulsifier, about 0.06 parts by weight of potassium hydroxide and about 0.3 parts by weight of potassium persulfate. The latex obtained after stripping off butanol contained 41.31% total solids, had a latex density of 0.976, and a pH of 7.75. The polymer contained therein had a ring and ball softening point of 102° C., an inherent viscosity of 0.703, a density of 0.94, a crystalline melting point of 96–102° C., and was colorless and odorless.

Table I below summarizes the properties of the starch-polyethylene surface-sized papers in comparison with starch-sized controls as determined by a number of standard tests. It can be seen from the table that, other properties remaining comparable, improved resistance to castor oil and ink penetration and greater smoothness are characteristic of the polyethylene-sized materials as compared with the controls. Moreover, the starch-polyethylene sized sheets were free of electrostatic cling and could be shuffled smoothly, or run through a xerographic duplicator without the development of residual electrostatic charge interfering with handling. The anti-static property of the paper did not interfere with the suitable production of a xerographic image on the polyethylene-sized sheets.

*Table I*

| Test | Control* (Starch Sized) | Starch and Anionic Latex | | | |
|---|---|---|---|---|---|
| | | 2% | 4% | 8% | 10% |
| Penetration, Carter 141 ink (seconds) | 325 | 350 | 420 | 560 | 510 |
| Penetration, Castor oil (seconds) | 34 | 38 | 38 | 47 | 44 |
| Smoothness, Williams (seconds): | | | | | |
| Felt side | 9.6 | 10.2 | 11.1 | 12.3 | 15.1 |
| Wire side | 6.5 | 8.0 | 10.8 | 8.8 | 12.2 |
| | | Starch and Nonionic Latex | | | |
| Penetration, Carter 141 ink (seconds) | 450 | 460 | 450 | 540 | 640 |
| Penetration, Castor oil (seconds) | 44 | 37 | 47 | 39 | 51 |
| Smoothness, Williams (seconds): | | | | | |
| Felt side | 8.9 | 10.8 | 15.0 | 11.4 | 13.8 |
| Wire side | 6.5 | 8.4 | 12.2 | 8.4 | 10.7 |

NOTE: The samples all had a basis weight (24 x 36–500) of between 54.5 and 55.7 and were comparable in caliber and density. Mullen burst strengths were all 39–40. Tear, tensile and fold strengths were comparable, or showed no consistent variation. Ingersoll gloss improved slightly for the samples treated with the anionic latex. Opacity and brightness values were comparable in all samples. Some improvements in IGT pick were evident in the samples sized with polyethylene from the nonionic latex. Gurley Densometer (porosity) readings were between 28 and 36.

\* Surface sizing with the anionic and nonionic latices was carried out on different days with paper prepared from the same furnish. The two controls were made from their respective beater batches.

EXAMPLE II

*Part A.*—One hundred sheets of paper from Example I that had been sized with a sizing mixture containing 8% solids (based on the starch solids) of the anionic polyethylene latex were placed in a Model 914 Xerographic Copier manufactured by the Xerox Corporation. Copy was printed on each of these sheets at the maximum speed of the printer. When the printed sheets were removed from the machine, they were substantially free of electrostatic charges and evidenced no tendency to cling together.

*Part B.*—Part A was repeated except that 100 sheets of a standard commercial printing paper were employed in lieu of the paper sized by the method of Example I. When these printed sheets were removed from the copier, they had developed strong electrostatic charges and clung tenaciously together. Even after a period of four hours after their removal from the copier, the sheets would cling together when the sheets were held freely suspended in air.

Although specific embodiments have been shown and described herein, it will be understood that departures may be made therefrom within the scope of the invention.

What is claimed is:

1. The method of surface sizing paper products which comprises contacting a paper surface with an aqueous fluid comprising an aqueous dispersion of starch in admixture with a stable latex comprising particles of polyethylene, and said particles having an average size between about 0.02 and about 0.5 micron.

2. The method as in claim 1 wherein said aqueous fluid comprises from about 2 percent to about 14 percent by weight of dispersed starch, and from about 2 percent to about 10 percent of latex solids by weight of said starch.

3. The method as in claim 1 wherein said aqueous fluid is applied to said paper surface in a size press.

4. A paper product surface-sized with starch and polyethylene wherein said starch is used in amounts of from about 8 to about 166 pounds per ton of paper, and said polyethylene is used in amounts of from about 0.15 to about 15.8 pounds per ton paper.

5. A fibrous cellulosic web having starch and particles of polyethylene deposited on surface portions thereof wherein said starch is used in amounts of from about 8 to about 166 pounds per ton of said fibrous cellulosic web, and said polyethylene is used in amounts of from about 0.15 to about 15.8 pounds per ton of said fibrous cellulosic web.

References Cited by the Examiner

UNITED STATES PATENTS

| | | | |
|---|---|---|---|
| 2,597,741 | 5/1952 | Macey. | |
| 2,653,919 | 9/1953 | Hunter | 26—23 |
| 2,668,156 | 2/1954 | Caldwell et al. | 117—155 |
| 2,739,058 | 3/1956 | O'Flynn et al. | 117—155 |
| 2,924,538 | 2/1960 | Nadelman | 117—155 |
| 3,095,391 | 6/1963 | Brockway et al. | 117—155 |

JOSEPH B. SPENCER, *Primary Examiner.*

RICHARD D. NEVIUS, JOSEPH REBOLD, *Examiners.*